United States Patent

Newman

Patent Number: 5,518,554
Date of Patent: May 21, 1996

[54] CASCADE PROCESS HEAT CONVERSION SYSTEM

[76] Inventor: Edwin Newman, 10331 Lindley Ave. #113, Northridge, Calif. 91326

[21] Appl. No.: 188,312

[22] Filed: Jan. 27, 1994

[51] Int. Cl.[6] .................................................. H01L 31/058
[52] U.S. Cl. ........................ 136/248; 136/206; 136/253; 60/641.8; 60/641.15
[58] Field of Search .................................. 136/248, 253, 136/206; 60/641.8, 641.15

[56] References Cited

U.S. PATENT DOCUMENTS

| | | | |
|---|---|---|---|
| 4,081,289 | 3/1978 | Campbell, III | 136/246 |
| 4,106,952 | 8/1978 | Kravitz | 136/248 |
| 4,109,701 | 8/1978 | Hilberath et al. | 165/1 |
| 4,161,657 | 7/1979 | Shaffer, Jr. | 290/1 R |
| 4,172,740 | 10/1979 | Campbell, III | 136/206 |
| 4,246,080 | 1/1981 | Shinn | 204/129 |
| 4,326,013 | 4/1982 | Jacobi et al. | 429/20 |
| 4,841,731 | 6/1989 | Tindell | 60/641.8 |
| 4,910,963 | 3/1990 | Vanzo | 60/641.8 |

OTHER PUBLICATIONS

M. A. Eaton, "Model and Design of Three–Cycle/Photovoltaic Thermal Solar Power System" (Publication Data Unknown).
W. E. Horne et al, "Improved Thermophotovoltaic Power System", 17th IECEC (1982), pp. 119–124.
D. R. Burger et al, "Low–Bandgap Thermophotovoltaic System Design", Am. Chem. Soc. (1993), pp. 1.1045–1.1049.

"Thermionic Power Generator", McGraw–Hill Encylcopedia of Science & Technology, pp. 289–291 (vol. & Publication date unknown).
B. Y. Moizhes, "Effectiveness of Low–Temperature Thermionic Converters for Topping the Rankine Cycle", (Publication Data Unknown).
G. A. Johnson, "The Alkali Metal Thermoelectric Converter (AMTEC) Radio–isotope Thermoelectric Generator (RTG)" (Publication Data Unknown).
R. K. Sievers et al, "Operation of Low Temperature AMTEC Cells", (Publication Data Unknown).
M. A. Ryan et al, "Emissivities & Thermal Characterization of Components for AMTEC Cells", Am. Chem. Soc. (1993), pp. 1.815–1.818.
J. W. Suitor et al, "Thermal Modelling of an AMTEC Recirculating Cell" (Publication Data Unknown).

Primary Examiner—Aaron Weisstuch

[57] ABSTRACT

This invention discloses a solar energy system wherein some of the waste heat of a thermophotovoltaic system is made to operate a thermionic power generator. The waste heat of the thermionic power generator is then made to operate an alkali-metal thermal electric converter, and the waste heat from the alkali-metal thermal electric converter as well as the rest of the waste heat of the thermophotovoltaic system is made to operate a methane reformation system. Stored heat from the methane reformation system is made to operate the invention at night. The overall efficiency of the example of the invention shown in the Summary is 42.6%.

5 Claims, 2 Drawing Sheets

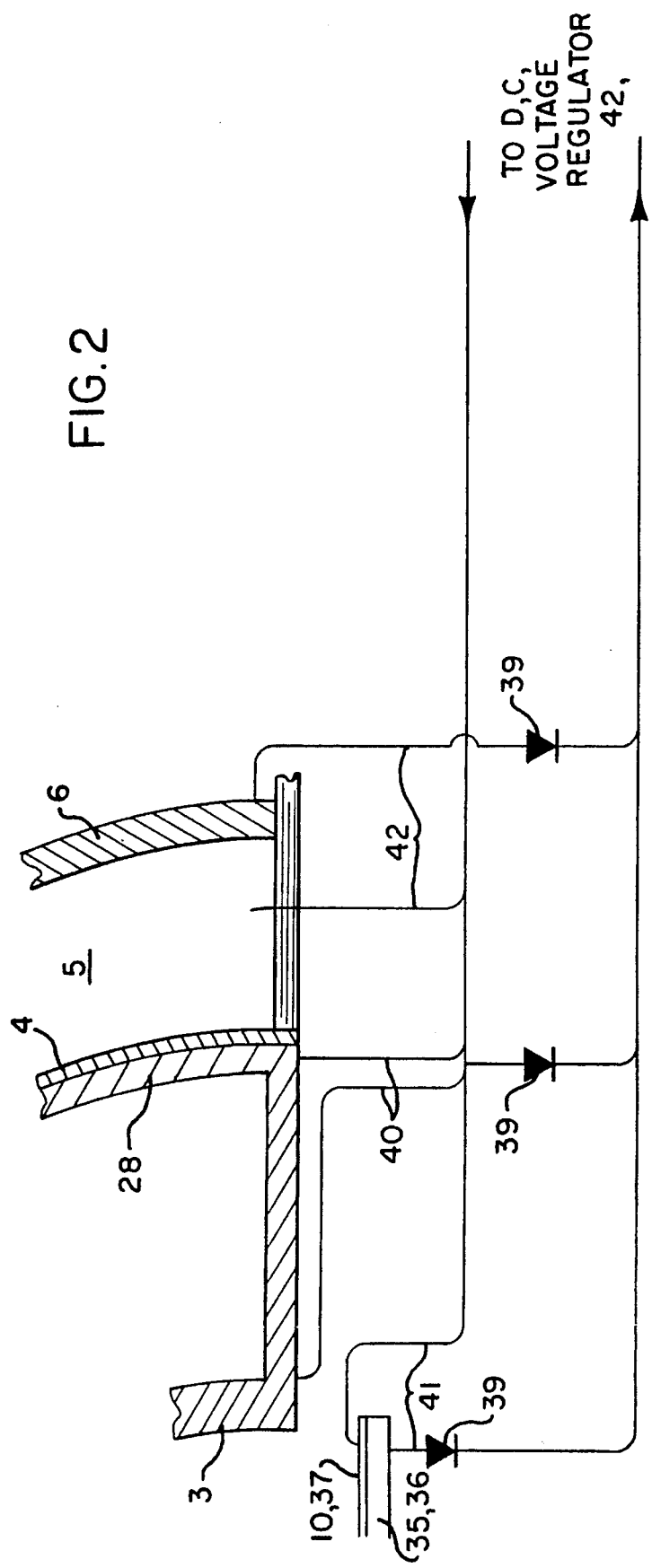

CASCADE PROCESS HEAT CONVERSION SYSTEM

BACKGROUND OF THE INVENTION

1. Field of the Invention

This invention pertains to four different methods of heat conversion:

a. Thermophotovoltaic systems
b. Thermionic power generation of the ignited cesium variety,
c. Alkali-metal thermoelectric converters,
d. Methane reformation.

More particularly it relates to the interrelation of these systems in a cogeneration scheme to convert solar energy into electricity. And most especially, it relates to ordering these different methods in descending order of their operating temperatures.

2. Description of the Prior Art

Each method by itself is known to researchers:

a. Thermophotovoltaic conversion is described in the paper "Improved Thermophotovoltaic Power System" W. E. Horne et al (17th IECEC) utilizing silicon photovoltaic cells, and "Low-Bandgap Thermophotovoltaic System Design" Burger and Ewell (1993 IECEC) utilizing InAs photovoltaic cells.

b. Thermionic power generation is well enough known to be the title of an article in the McGraw-Hill Encyclopedia of Science and Technology.

c. Alkali-metal thermal electric converters are the subject of many papers, such as "Operation of Low Temperature AMTEC Cells" R. K. Sievers et al (1992 IECEC).

d. Methane reformation is described in such as U.S. Pat. No. 4,109,701 to Hilberath et al.

Each method has its own art and within each art attempts are well known to unite the method in question to a solar power production cycle. (See e.g. U.S. patent application Ser. No. 08/065,479 Photovoltaic Cogeneration System.) Further, using Thermionic converters to top a Rankine cycle in a cogeneration scheme is also well known. See e.g. "Effectiveness of low-temperature thermionic converters for topping the Rankine cycle", Boris Y. Moizhes (1993 IECEC). Methods a., b., and c. each give a fairly low efficiency of power conversion, while method d. on the one hand has a fairly high efficiency, but on the other is used only for transportation and storage of energy.

None of the above methods have been combined so far, despite the fact each may be made to operate at different temperature ranges, thus opening up the opportunity of creating cogeneration schemes to raise power production system efficiency.

SUMMARY OF THE INVENTION

Accordingly, it is an object of this invention to raise the efficiency of solar power production systems through providing a new cogeneration system with a minimum number of moving parts.

The attainment of this and related objects may be achieved through use of the novel cogeneration system herein disclosed.

Insolation is concentrated by a system of lenses and reflectors onto a tungsten target which transfers heat to a polished tungsten half-shell which thereby is made to glow. The inside of the shell reflects light onto a flat plate covered with silicon photovoltaic cells, which are made to produce electrical energy. Around the outside of the tungsten half-shell is a second half-shell. The small distance between the half-shells is filled with Cesium gasified by incoming heat from the innermost half-shell. The two half-shells and cesium gas describe a thermionic power converter and further electrical energy is drawn from it. The outer side of the second half-shell is clad with Inconel 600. The second half-shell is surrounded on its outside by a third half-shell made of beta alumina. In turn, the third half-shell is surrounded on its outside by a fourth half-shell made of Inconel 600. The Inconel 600 cladding of the second half-shell, and also the third and fourth half-shell describe the basic structure of an Alkali-Metal Thermal Electric Converter. Liquid Sodium is made to move through the beta alumina shell towards the fourth half-shell. The Sodium is heated by heat from the second half-shell. Electrical energy is made to be produced by this converter also.

Underneath the photovoltaic cells and also next to the external surface of the beta alumina half-shell is part of a Methane Reformation system which converts methane and water into hydrogen and carbon monoxide at ambient temperature. The reaction is endothermic and will absorb excess heat from the photovoltaic cells and hot Sodium. If not enough heat is absorbed from the photovoltaic cells by the conversion reaction, a further water cooling apparatus is provided.

At night the stored hydrogen and carbon monoxide are run through a methanator. The heat produced by the chemical reaction in the methanator is transferred to liquid Sodium which is made to heat up the tungsten target, albeit at a lower temperature than in daytime operation of the overall system. Since the temperature is lowered, a plate of InAs photovoltaic cells is substituted for the plate of silicon photovoltaic cells.

The resulting electric output from the invention is stored in batteries as the output will be variable, and the battery output can then be used to operate a motor-generator at the desired wattage.

Estimated optimum performance conditions are shown by the following table:

| Condition | Input power, W. | Target temp. K | Cs Collector temp. K |
|---|---|---|---|
| day | 320,000 | 2200 | 1525 |
| night | 90,035 | 1,123 | |

| Condition | AMTEC Condenser temp K. | Cesium | AMTEC | Methane |
|---|---|---|---|---|
| day | 975 | 9.8% | 13.4% | 31.3% |
| night | 750 | 0 | 2.9% | 0 |

| Condition | PV cells | Output Power | Stored Power |
|---|---|---|---|
| day | 13.3% | 36.6% | 31.3% |
| night | 3.1% | 6.0% | −31.3% |

Overall Efficiency=42.6%

The attainment of the foregoing and related objects, advantages and features of the invention should be more readily apparent to those skilled in the arts indicated, after review of the following more detailed description of the invention, taken together with the drawing in which:

BRIEF DESCRIPTION OF THE DRAWING

FIG. 2 is a close-up of part of FIG. 1 to better show the electric wiring.

DETAILED DESCRIPTION OF THE PREFERRED MODE

Figure 1:
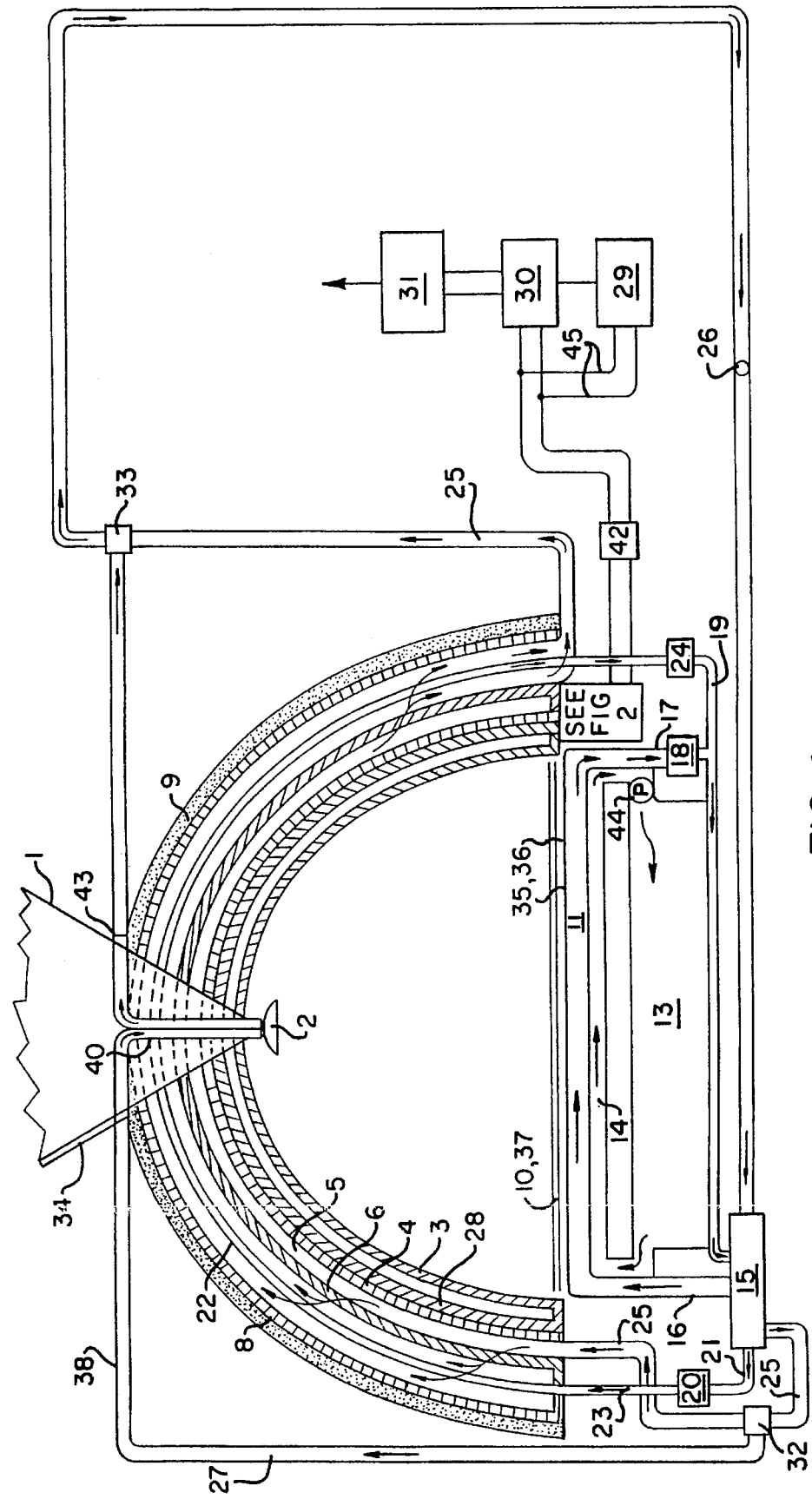
FIG. 1 is a cross-section of a schematic view of a system in accordance with the invention.

Turning now to the drawing, there is a shown a funnel 1 along which incoming insolation is focused upon a target 2 which is made of tungsten polished on both sides. Target 2 is surrounded by four concentric shells, each in the shape of a half-ellipse, and also a flat plate 35 across the base of the shells. The inner surface of the innermost shell 3 is an estimated one meter diameter, 1.57 meters$^2$ area, and 0.577 meters high, assuming a 320,000 watt/input for example. The shell material is polished tungsten and 1 cm thick. The second shell 28 is located less than 1 cm outside the innermost shell 3. The gap between the two shells is filled with Cesium gas. The first and second shells along with the cesium gas between them define the main structure of a thermionic power generator. This second shell 28 is clad on its outer surface with a layer 4 of Inconel 600. The next outer shell 6 in sequence is made of beta alumina resting on a porous electrode base. The next and last outer shell 8 is made of Inconel 600. The spaces between the second and third shells, and the third and fourth shells are filled with Sodium gas. The three outer shells and the Sodium gas between them define the main structure of an Alkali-Metal Thermal Electric Conversion System.

A photovoltaic cell array 10 is affixed to a flat plate 35 which may be removed from the invention by some suitable means for the nighttime operation described below. Underneath the plate 35 is a grid of tubing 11 filled with a catalyst. An optional cooling circuit is shown below the tubing 11 which consists of a plumbing system 14, a pump 36, and a reservoir 13.

The methane reformation subsystem of the invention consists of the aforementioned catalyst-filled tubing 11, incoming 16 and outgoing 17, 19 tubes, facility for gas storage 18, and a methanator 15. A secondary plumbing circuit runs from methanator 15 to a gas storage facility 20 via tube 21 and on to a catalyst-filled grid of tubing 22 located next to the third shell 6. The circuit continues with tube 23 and gas storage facility 24. Tube 19 completes this circuit.

The Alkali-Metal Thermal Electric Conversion system has its own separate tubing circuit indicated by tube 25, electromagnetic pump 26, said tube running through the methanator 15.

Each of the three electric power producing subsystems—Thermophotovoltaic, thermionic, and Alkali-Metal Thermoelectric Conversion feeds battery 29 through a D.C. voltage regulator 42 which in turn is wired to an electric motor 30 which in its turn is made to energize an electric generator 31 to produce power at the desired rate. Diodes 39 are installed in all circuits to prevent reverse power flow.

Nighttime operation utilizes the heat emitted by the methanator 15 and further involves two new structures:

1. Pipe 25, valves 32, 33, and insulated pipe 27 between the two valves, all made of Inconel 600. Pipe 27 is made to go through a slot 34 in funnel 1, dip down to touch the target 2 rise to its former level and go to a detachable seal and pipe join 43. The dipping section of pipe 27 may be made to pivot at second detachable seal and pipe joint 38 when pipe 27 is not in use, and funnel 1 is in use.

2. As previously mentioned, silicon photovoltaic cell array 10 and its substrate 35 may be removed from the device. At night, another flat plate 36 and InAs photovoltaic array would be substituted.

In operation, insolation is focused by a lens and reflector system (not shown) through funnel 1 onto target 2. Target 2 radiates energy onto the innermost tungsten shell 3 to such an extent that the shell glows. Electrons are emitted from innermost shell 3 to a second shell 28 across a gap filled with Cesium ions, thus closing an electric circuit 40 which charges a battery 29 through wires 45. Waste heat moves outward through second shell 28 which is clad on its outer surface 4 with Inconel 600 as this surface comes in contact with corrosive liquid Sodium. This Sodium is pumped into gap 5 between second shell 28 and third shell 6 through pipe 25 by means of electromagnetic pump 26. The Sodium is heated by the waste heat coming from second shell 28/4, causing Sodium ions to move through the beta-alumina third shell 6. Electrical leads make contact with the Sodium in gap 5 and the outer surface of the third shell 6. As Sodium ions travel through third shell 6 an electric circuit is closed providing a charge to battery 29 through wires 45. Waste heat is emitted from the outer surface of shell 6. This waste heat moves through a grid of Inconel 600 tubing 22 filled with a catalyst. Methane and water vapor are pumped through catalyst-filled grid 22 and in the presence of incoming waste heat the methane and water vapor are reformed into hydrogen and carbon monoxide gases. The gases are transported from grid 22 by pipe 23 to a gas storage facility 24. When desired, the gases are then pumped to a methanator 15 through pipe 19. Within the methanator the gases are reformed (producing heat) back to methane and water vapor, which may be stored in a gas storage facility 20 and/or transported back to grid 22 through pipe 21.

Sodium ions moving through grid 22 will be made to give up substantial heat and move into the gap defined by grid 22 and Inconel 600 shell 8. The cooled Sodium ions will then be transported through an electromagnetic pump 26 by pipe 25 to complete a circuit. The user may desire to cover the outside of shell 8 with insulation 9 to minimize further heat loss.

At night, a tray 35 of silicon photovoltaic cells is removed and substituted by a tray 36 of InAs photovoltaic cells 37, since the operating temperature of the invention will be lower. Also, pipe 41 which is a section of pipe 27 is made to pivot about point 38 through slot 34 in funnel surface 1 so completed pipe circuit 27/40 will dip to touch the target 2. Gases produced during daytime operation stored in storage facilities 24, 18 are fed through pipe 19 to methanator 15 where heat is released to Sodium in pipe 25 as it is moved through methanator 15. Valve 32 is made to shift its setting and this heated Sodium is released through pipe 27, as well as gap 5 heating target 2 to the desired temperature. The cooled Sodium returns to pipe 25 through valve 33. The temperature of the target will be lower than for daytime operation in our example and this is why a different type of photovoltaic cell is used. For either type of cell, wires 41 show the completion of an electric circuit to charge battery 29. Day or night, the heat of target 2 causes innermost shell 3 to glow on both sides, on the one hand emitting energy to the photovoltaic cells and on the other side of shell 3 sending heat outward. Under the tray 35/36 is a catalyst-filled grid 11 similar to grid 22. From methanator 15 methane and water vapor are piped to grid 11 through pipe 16 and hydrogen and carbon monoxide gases are pumped back to methanator 15 from grid 11 through pipes 17, 19. Facilities 18 and 24 for storing the hydrogen and carbon monoxide gases are provided within this tubing circuit. As the methane reforming process occurring within grid 11 is endothermic, the photovoltaic array is cooled to a desired temperature. If further cooling is desired, water may be pumped through pipe 14 by pump 44 and the heat absorbed from the photovoltaic array be dissipated in reservoir 13.

It should now be apparent to those skilled in the indicated arts that a novel heat conversion system capable of achieving the stated object of the invention has been provided.

It should further be apparent to those skilled in the indicated arts that various changes in form and details of the invention as shown and described may be made. It is intended that such changes be included within the spirit and scope of the claims appended hereto.

What is claimed is:

1. A heat conversion system comprising:
   a. a light gathering/concentrating means for activating a radiatively emissive target means;
   b. a thermophotovoltaic subsystem to convert solar insolation into electrical energy;
   c. a thermionic power subsystem to convert the waste heat of said thermophotovoltaic subsystem into electric energy;
   d. an alkali-metal thermal electric conversion subsystem to convert the waste heat of said thermionic power subsystem into electric energy;
   e. a methane reformation subsystem to convert the waste heat of said thermophotovoltaic subsystem and said alkali-metal thermoelectric converter subsystem into storable heat energy;
   f. pipe means to transfer heat from storage facilities to heat said thermophotovoltaic subsystem at night; and
   g. electric power production means to provide a steady rate of power production.

2. The system of claim 1, wherein said thermionic power subsystem encloses said thermophotovoltaic subsystem.

3. The system of claim 1, wherein said alkali-metal thermal electric conversion subsystem encloses said thermionic power subsystem.

4. The system of claim 1, wherein catalyst-filled pipes of the said methane reformation subsystem encloses a beta alumina/porous electrode of the said alkali-metal thermal electric conversion subsystem.

5. A method for converting solar energy to electrical energy, comprising the steps of:
   a. transmitting incident solar flux to a target mass, thereby raising the temperature of said mass;
   b. reflecting the incoming heat from said mass to the inside of a half-shell to such an extent that the inner and outer surfaces of the half-shell glow;
   c. transferring the radiation from the glowing inner surface of said half-shell to a photovoltaic array;
   d. operating said photovoltaic array to produce electrical energy;
   e. utilizing the electrons emitted from the glowing outer surface of said half-shell to produce electrical energy in a thermionic power generator arrangement;
   f. utilizing the waste heat from said thermionic power generator arrangement to operate an alkali-metal thermal electric converter to further produce electrical energy;
   g. utilizing the waste heat from said photovoltaic array to operate a methane reforming system to store heat energy;
   h. utilizing the waste heat from said alkali-metal thermal electric converter to operate a methane reforming system to store heat energy;
   i. utilizing said stored heat to heat up said target mass at night or on cloudy days;
   j. utilizing the variously produced electrical energy to charge an electric storage apparatus which is connected to electric machines.

* * * * *